(12) United States Patent
Uefune et al.

(10) Patent No.: US 10,998,008 B1
(45) Date of Patent: May 4, 2021

(54) INTERFACE CONNECTOR FOR TAPE EMBEDDED DRIVE

(71) Applicant: Western Digital Technologies, Inc., San Jose, CA (US)

(72) Inventors: Kouki Uefune, Kanagawa (JP); Hajime Eguchi, Kanagawa (JP); Toshio Takahashi, Tokyo (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/907,003

(22) Filed: Jun. 19, 2020

(51) Int. Cl.
*G11B 33/12* (2006.01)
*G11B 5/008* (2006.01)
*G11B 15/32* (2006.01)

(52) U.S. Cl.
CPC ........ *G11B 33/122* (2013.01); *G11B 5/00813* (2013.01); *G11B 15/32* (2013.01); *G11B 33/124* (2013.01)

(58) Field of Classification Search
CPC . G11B 33/122; G11B 33/124; G11B 5/00813; G11B 15/32
USPC .............................................. 360/96.1, 96.51
See application file for complete search history.

(56) References Cited

U.S. PATENT DOCUMENTS

| | | |
|---|---|---|
| 2,578,221 A | 12/1951 | Bodmer |
| 3,168,232 A | 2/1965 | Beaver |
| 3,176,927 A | 4/1965 | Irazoqui |
| 3,667,701 A | 6/1972 | Blum |
| 3,692,956 A | 9/1972 | Northrup |
| 3,987,980 A | 10/1976 | Sperry |
| 4,009,846 A | 3/1977 | Coruzzi |
| 4,080,638 A | 3/1978 | Platt |
| 4,266,255 A | 5/1981 | Camras |
| 4,303,210 A | 12/1981 | Fujita et al. |
| 4,562,497 A | 12/1985 | Morinaga et al. |
| 4,575,022 A | 3/1986 | Allwine, Jr. et al. |
| 4,750,062 A | 6/1988 | Suzuki |
| 5,055,947 A | 10/1991 | Satoh |

(Continued)

FOREIGN PATENT DOCUMENTS

| | | |
|---|---|---|
| CA | 1257387 A | 7/1989 |
| JP | H08315450 A | 11/1996 |

(Continued)

OTHER PUBLICATIONS

Lenovo, "IBM LTO Ultrium Tape Drives for Lenovo"; Lenono Press; https://lenovopress.com/tips1305.pdf (17 pages).

(Continued)

*Primary Examiner* — Allen T Cao
(74) *Attorney, Agent, or Firm* — Patterson & Sheridan, LLP; Steven H. Versteeg (57) ABSTRACT

The present disclosure generally relates to an interface connector in a tape embedded drive. The tape embedded drive has two long edges and two short edges. Within the tape embedded drive, there are numerous guide rollers, at least three feedthrough connectors, and two reels. The interface connector is located along one of the short edges and underneath one of the two reels. By placing the interface connector at that location, the tape embedded drive has sufficient real estate for all of the necessary reels, feedthrough connectors, and guide rollers while also ensuring stability of the tape embedded drive.

20 Claims, 8 Drawing Sheets

(56) References Cited

U.S. PATENT DOCUMENTS

| | | |
|---|---|---|
| 5,543,992 A | 8/1996 | Hu et al. |
| 5,881,960 A | 3/1999 | Christie |
| 5,883,771 A | 3/1999 | Hoerger |
| 6,163,432 A | 12/2000 | Van Den Dungen |
| 6,466,400 B1 | 10/2002 | Iwahara et al. |
| 8,493,686 B2 | 7/2013 | Kimura et al. |
| 8,611,047 B2 * | 12/2013 | Ohtsu ............... G11B 5/59638 360/130.21 |
| 9,824,715 B2 | 11/2017 | Vanderheyden |
| 9,892,751 B1 | 2/2018 | Harper |
| 2004/0004789 A1 | 1/2004 | Watanabe et al. |
| 2004/0089755 A1 | 5/2004 | Evanoff et al. |
| 2004/0190216 A1 | 9/2004 | Yip et al. |
| 2007/0008683 A1 | 1/2007 | Gavit et al. |
| 2007/0236827 A1 * | 10/2007 | Eaton ................... G11B 15/602 360/93 |
| 2008/0198506 A1 | 8/2008 | Weng et al. |
| 2009/0316299 A1 | 12/2009 | Tashiro et al. |
| 2010/0315747 A1 * | 12/2010 | Matsumoto ........... G11B 5/3116 360/246.2 |
| 2012/0206832 A1 | 8/2012 | Hamidi et al. |
| 2012/0300344 A1 * | 11/2012 | Brause ..................... B24B 1/00 360/98.08 |
| 2013/0003221 A1 * | 1/2013 | Kim ..................... G11B 5/6011 360/75 |
| 2013/0019465 A1 | 1/2013 | Childers et al. |
| 2013/0021694 A1 * | 1/2013 | Childers .............. G11B 23/049 360/96.1 |
| 2013/0050872 A1 | 2/2013 | Sekii et al. |
| 2013/0050875 A1 * | 2/2013 | Yamada ............... G11B 5/1278 360/125.3 |
| 2013/0301159 A1 * | 11/2013 | Mori ....................... G11B 5/41 360/96.1 |
| 2014/0118858 A1 * | 5/2014 | Noda ................... G11B 5/5565 360/86 |
| 2015/0310881 A1 | 10/2015 | Koui |
| 2016/0104515 A1 * | 4/2016 | Strange ................ G11B 33/027 360/99.18 |
| 2016/0111118 A1 * | 4/2016 | Funayama ........... G11B 5/4853 360/234.3 |

FOREIGN PATENT DOCUMENTS

| | | |
|---|---|---|
| JP | H10-24134 A | 1/1998 |
| JP | H10-241340 A | 9/1998 |

OTHER PUBLICATIONS

Related U.S. Appl. No. 16/365,034, filed Mar. 29, 2019 (39 pages).
Tape Drives and Media, LTO Drive Requirements and Compatibility; https://qsupport.quantum.com/kb/flare/content/Scalar_i6000/docCenter/, 2020, (2 pages).

* cited by examiner

INTERFACE CONNECTOR FOR TAPE EMBEDDED DRIVE

BACKGROUND OF THE DISCLOSURE

Field of the Disclosure

Embodiments of the present disclosure generally relate to an interface connection for a tape embedded drive.

Description of the Related Art

Tape data storage is a system for storing digital information on magnetic tape using digital recording. Tape storage media is more commonly packaged in cartridges and cassettes. A tape drive performs writing or reading of data in the cartridges or cassettes. A common cassette-based format is LTO, which comes in a variety of densities.

Tape drives operate by using a tape head to record and read back information from tapes by magnetic processes. The tape head comprises servo elements and data elements that are arranged in an array that is oftentimes referred to as a tape head array. Tape drives also have sensors as well as motors.

In order to accommodate the power lines for the motors, signal lines for sensors, and signal lines for the tape head, at least three feedthrough connectors are needed. With three feedthrough connectors, as well as guide rollers, the tape head, and the tape reels, space is at a premium, and finding a location for the interface feedthrough is challenging.

Therefore, there is a need in the art for an improved interface connection for a tape drive.

SUMMARY OF THE DISCLOSURE

The present disclosure generally relates to an interface connector in a tape embedded drive. The tape embedded drive has two long edges and two short edges. Within the tape embedded drive, there are numerous guide rollers, at least three feedthrough connectors, and two reels. The interface connector is located along one of the short edges and underneath one of the two reels. By placing the interface connector at that location, the tape embedded drive has sufficient real estate for all of the necessary reels, feedthrough connectors, and guide rollers while also ensuring stability of the tape embedded drive.

In one embodiment, a storage device comprises: an enclosure, wherein the enclosure comprises a first wall, a second wall, a third wall connecting the first wall and the second wall, a fourth wall connecting the first wall and the second wall, and a bottom surface coupled to the first wall, the second wall, the third wall, and the fourth wall; a first spindle disposed within the enclosure; a second spindle disposed within the enclosure; and an interface connector coupled to the enclosure along the first wall, wherein the interface connector is disposed closer to the third wall than the fourth wall, and wherein a center of the first spindle and a center of the second spindle are disposed closer to the third wall than the fourth wall.

In another embodiment, a storage device comprises: an enclosure having a first wall, a second wall, a third wall connecting the first wall and the second wall, a fourth wall connecting the first wall and the second wall, and a bottom surface coupled to the first wall, the second wall, the third wall, and the fourth wall, wherein the first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall; a first spindle disposed within the enclosure and coupled to the bottom surface; a second spindle disposed within the enclosure and coupled to the bottom surface; a tape head disposed within the enclosure; and an interface connector coupled to the bottom surface and the first wall, wherein the interface connector is disposed at a location below a hypothetical reel that would be disposed in the first spindle.

In another embodiment, a storage device comprises: an enclosure having a first wall, a second wall, a third wall connecting the first wall and the second wall, a fourth wall connecting the first wall and the second wall, and a bottom surface coupled to the first wall, the second wall, the third wall, and the fourth wall, wherein the first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall; a first spindle disposed within the enclosure and coupled to the bottom surface; a second spindle disposed within the enclosure and coupled to the bottom surface; a tape head disposed within the enclosure; and an interface connector coupled to the bottom surface, wherein a center of the interface connector, a center of the first spindle, and a center of the second spindle are each spaced a first distance from the third wall and a second distance from the fourth wall, and wherein the first distance is less than the second distance.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to an interface connector in a tape embedded drive. The tape embedded drive has two long edges and two short edges. Within the tape embedded drive, there are numerous guide rollers, at least three feedthrough connectors, and two reels. The interface connector is located along one of the short edges and underneath one of the two reels. By placing the interface connector at that location, the tape embedded drive has sufficient real estate for all of the necessary reels, feedthrough connectors, and guide rollers while also ensuring stability of the tape embedded drive.

Figure 1A:
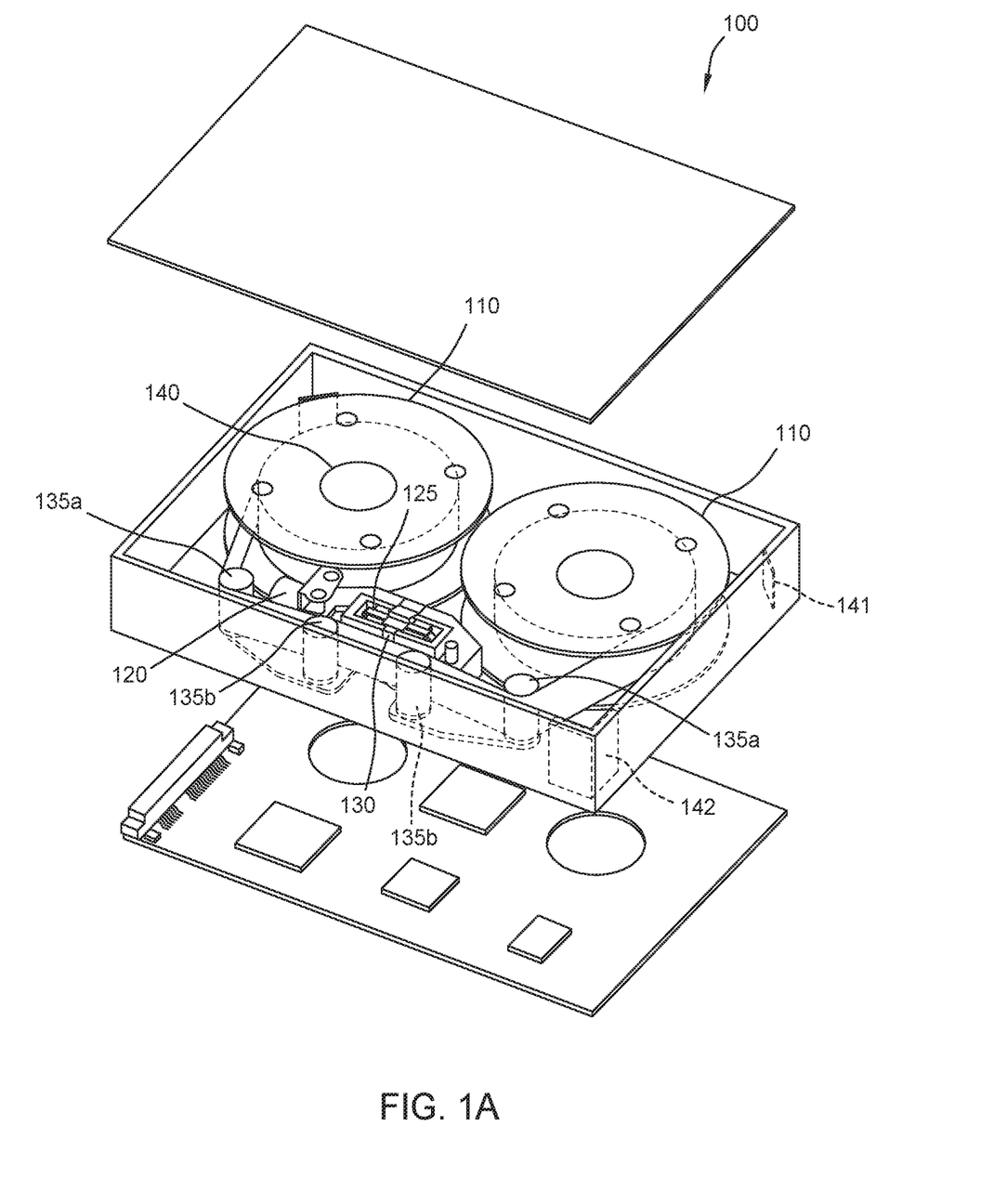
FIGS. 1A-1C illustrate a perspective exploded view and a simplified top down and side profile view of a tape embedded drive, in accordance with some embodiments.
Figure 1B:
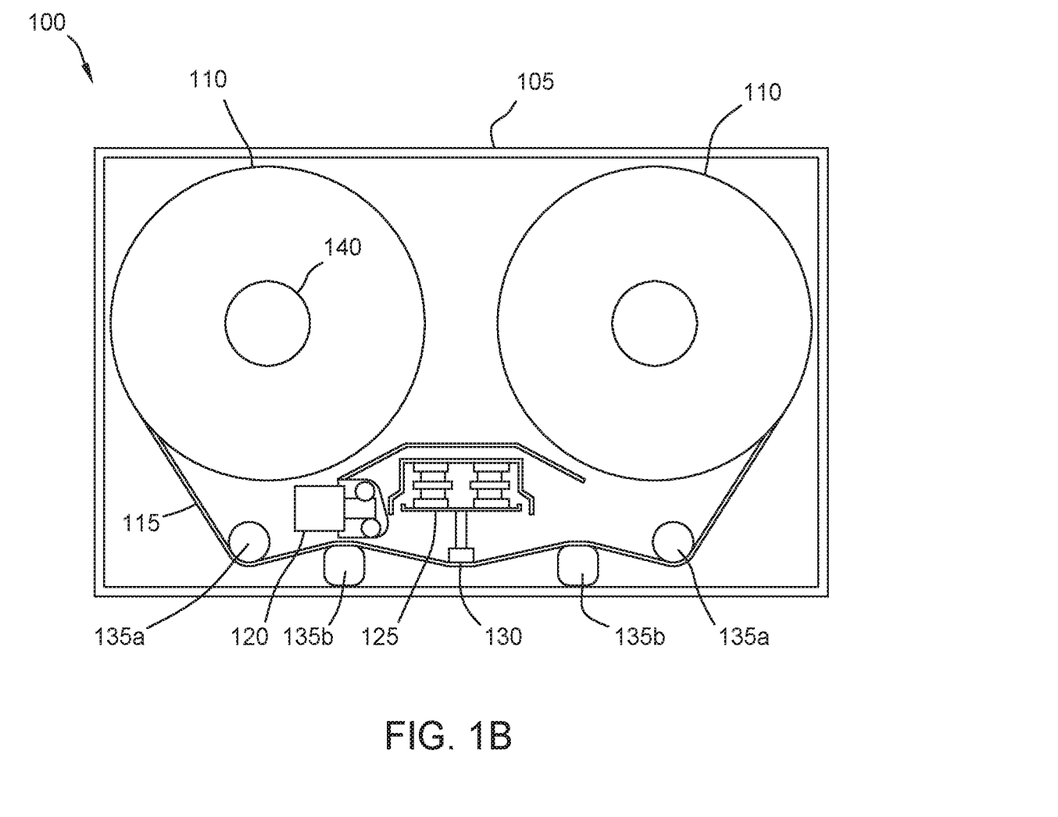
Figure 1C:
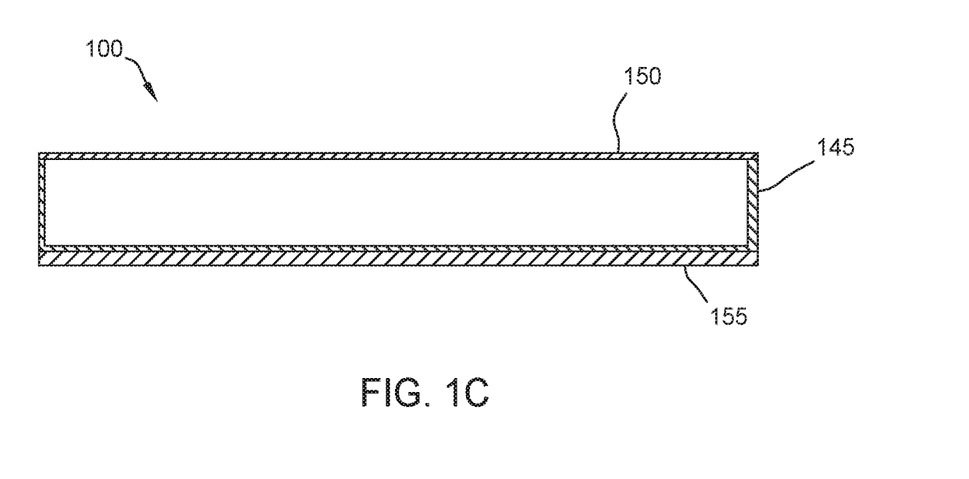

FIGS. 1A-1C illustrate a perspective exploded view and a simplified top down and side profile view of a tape embedded drive, in accordance with some embodiments. Focusing on FIG. 1B, for example, the tape embedded drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135*a*, 135*b*. Focusing on FIG. 1C, for example, the tape embedded drive further comprises a printed circuit board assembly (PCBA). In an embodiment, most of the components are within an interior cavity of the casing, except the PCBA, which is mounted on an external surface of the casing. The same components are illustrated in a perspective view in FIG. 1A.

In the illustrated embodiments, two tape reels 110 are placed in the interior cavity of the casing, with the center of the two tape reels on the same level in the cavity and with the head assembly 130 located in the middle and below the two tape reels. Tape reel motors located in the spindles of the tape reels can operate to wind and unwind the tape media 115 in the tape reels. Each tape reel may also incorporate a tape folder to help the tape media 115 be neatly wound onto the reel. The tape media may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels are biased against the guides/rollers 135*a*, 135*b* (collectively referred to as guides/rollers 135) and are movably passed along the head assembly 130 by movement of the reels. The illustrated embodiment shows four guides/rollers 135*a*, 135*b*, with the two guides/rollers 135*a* furthest away from the head assembly 130 serving to change direction of the tape media 115 and the two guides/rollers 135*b* closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor and stepping motor may variably position the tape head(s) transversely with respect to the width of the recording tape. The stepping motor may provide coarse movement, while the voice coil motor may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape embedded drive 100 within the casing. In particular, as the head mechanism is internal to the casing in certain embodiments, the tape media 115 may not be exposed to the outside of the casing, such as in conventional tape drives. Thus, the tape media 115 does not need to be routed along the edge of the casing and can be freely routed in more compact and/or otherwise more efficient ways within the casing. Similarly, the head(s) and tape reels may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA is made of solid state electronics, environmental issues are less of a concern, so it does not need to be placed inside the casing 105. That leaves room inside casing for other components, particularly, the moving components and the tape media 115 that would benefit from a more protected environment.

In some embodiments, the tape embedded drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing.

In one embodiment, the cover 150 is used to hermetically seal the tape embedded drive. For example, the drive 100 may be hermetically sealed for environmental control by attaching (e.g., laser welding, adhesive, etc.) the cover to the base 145. The drive 100 may be filled by helium, nitrogen, hydrogen, or any other typically inert gas.

In some embodiments, other components may be added to the tape embedded drive 100. For example, a pre-amp for the heads may be added to the tape embedded drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

Figure 2:
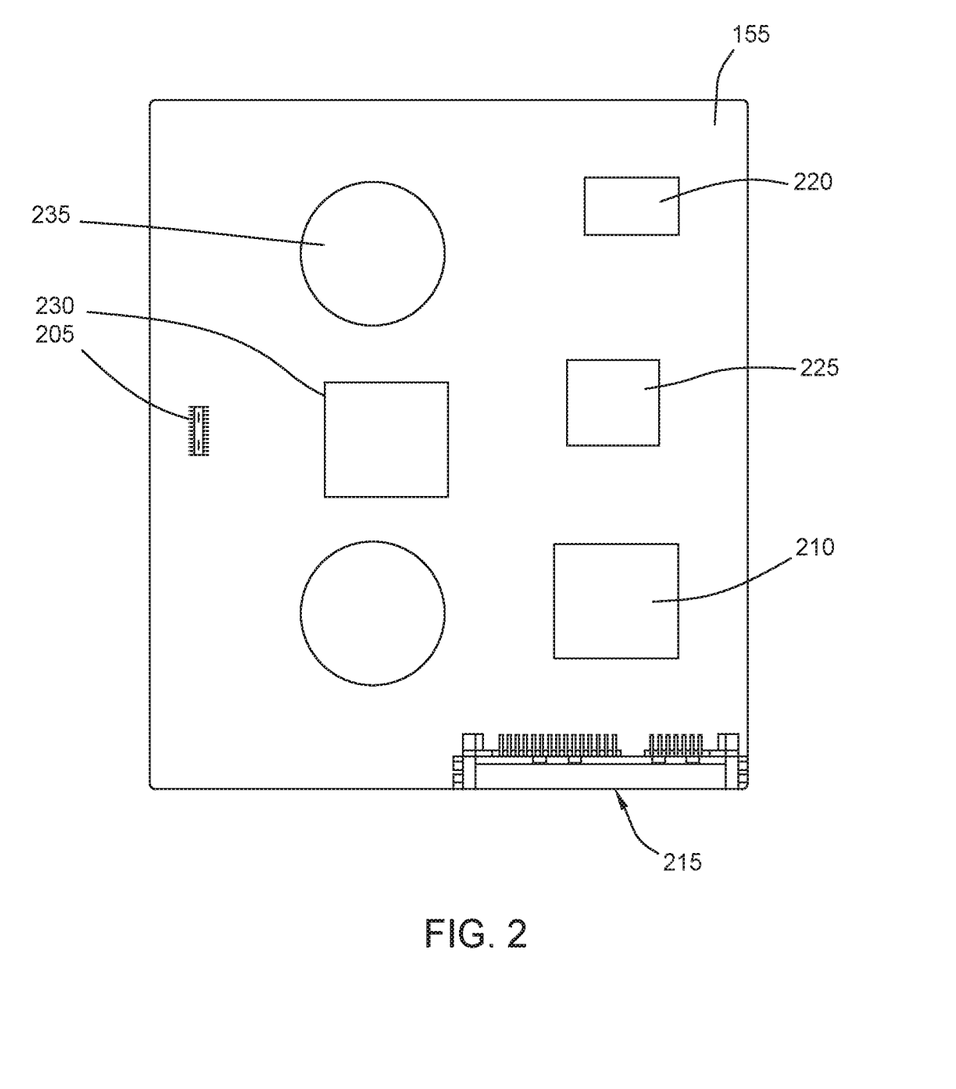
FIG. 2 illustrates a top perspective view of a printed circuit board assembly (PCBA) of the tape embedded drive, in accordance with some embodiments.

FIG. 2 illustrates a top perspective view of a printed circuit board assembly (PCBA) 155 of the tape embedded drive 100, in accordance with some embodiments. The PCBA 155 of the tape embedded drive may be the PCBA 155 of FIG. 1. The PCBA 155 is attached to the bottom surface of the casing, with a connector 205 attaching to contacts or an interface on the bottom surface electrically/ electronically connected to internal components in the casing. For example, the contacts or interface may be electrically connected to one or more motors and/or actuators within the casing. In one embodiment, the contacts/interface are built into the casing without comprising an air tight seal of the casing. In some embodiments, the connector 205 may be an electrical feedthrough electrically connecting components inside the casing to those on the PCBA, while maintaining sealing of the casing.

The PCBA 155 can include various components, such as one or more controllers, one or more connectors 205, a system on a chip (SoC) 210, one or more data interfaces 215 (e.g., Serial ATA (SATA), Serial Attached SCSI (SAS), non-volatile memory express (NVMe), or the like), a memory 220, a Power Large Scale Integration (PLSI) 225, and/or data read channel controller 230. One or more cutouts 235 can be added in the PCBA 155 to provide additional space for tape reel motors, if needed. For example, the portion of the casing above the tape reel motors may be raised to provide additional space for the motors. By providing cutouts 235, the thickness of the tape embedded drive 100 may be reduced as the PCBA 155 may surround the raised portion of the casing.

The PCBA 155 may extend along the entire bottom exterior surface of the casing 105 or may only partially extend along the surface, depending on how much space the various components need. In some embodiments, a second PCBA 155 may be located internally in the casing 105 and be in communication with the first PCBA 155, for example, via the connector 205.

In some embodiments, a controller on the PCBA 155 controls the read and write operations of the tape embedded drive 100. The controller may engage the tape spool motors and cause the tape spools to wind the tape film forwards or backwards. The controller may use the stepping motor and the voice coil motor to control placement of the head(s) over the tape film. The controller may also control output/input of data to or from the tape embedded drive 100 through the one or more interfaces 215, such as SATA or SAS.

While the above discusses the tape embedded drive 100 as having a casing with a 3.5 inch form factor like that of HDDs, the tape embedded drive 100 may use other form factors. For example, if tape technology become sufficiently miniaturized in the future, then the tape embedded drive could use a 2.5 inch drive form factor, like that used by laptop HDDs. In some embodiments, where larger sizes are desired, the tape embedded drive 100 may use a 5.25 inch drive form factor for the casing, such as those used by computer CD-ROMs. Furthermore, the tape embedded drive 100 may use the 3.5 inch form factor with some variations. For example, the drive may be slightly longer/shorter, slightly thicker/thinner, or the like. Even with slight differences in dimensions or placement of data/power interfaces, the drive 100 may still be compatible with existing 3.5 inch drive form factor based infrastructure found in various computer equipment, such as racks and servers.

Figure 3:
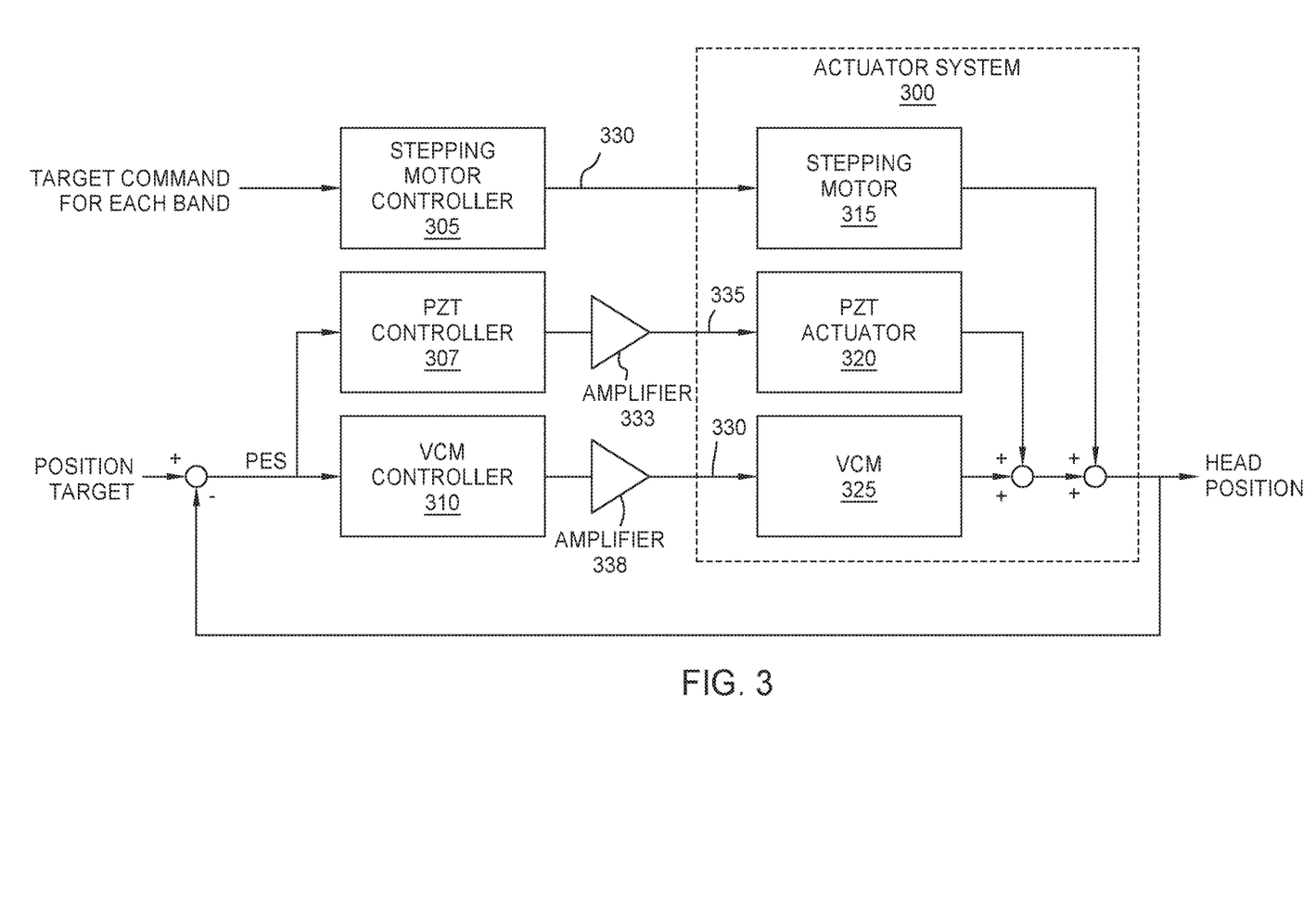
FIG. 3 illustrates a control block diagram for a servo-mechanical system of the tape embedded drive, in accordance with some embodiments.

FIG. 3 illustrates a control block diagram for a servo-mechanical system 300 of the tape embedded drive 100, in accordance with some embodiments. The control logic for the system may be implemented as a process in one or more controllers of the tape embedded drive 100, such as the SoC and/or PLSI in the PCBA and used to control one or more motors and/or one or more actuators.

In an embodiment, a stepping motor controller 305, a PZT controller 307, and a VCM controller 310 work together to control a stepping motor 315, a PZT actuator 320, and a VCM 325 to coordinate the movement of the head(s) in response to a target command.

As discussed above, the stepping motor 315 may provide coarse movement, the VCM 325 may provide fine movement, and the PZT actuator 320 may provide very fine movement. For example, assuming a 12.65 mm tape width, the stepping motor stroke may be about 12.65 mm, with the VCM stroke at about 4 mm, and the PZT stroke at about 4 µm. In this embodiment, the various strokes creates a movement ratio of about 30,000:10,000:1 (stepping motor: VCM:PZT actuator). In other embodiments, the ratios may be different based on the performance specifications of the motors and the actuators.

A first control signal 330 is sent from the stepping motor controller to the stepping motor. The head(s) are then moved in a coarse movement. In an embodiment, a head position sensor detects the position of the head(s) after the first movement and provides a positive error signal (PES) to the VCM and PZT controllers. In response, the VCM and the PZT controllers may further move the head(s) in a fine and a very fine movement, respectively, if needed, to place the head(s) into the desired position.

A first amplifier 333 may be positioned in between the PZT controller 307 and the PZT actuator 320 to amplify a second control signal 335. A second amplifier 338 may be positioned in between the VCM controller 310 and the VCM 325 to amplify a third control signal 340.

In an embodiment, the PZT actuator 320 and the VCM 325 move the head(s) serially. The VCM first moves the head(s) and then, if the head(s) are within a first threshold distance from the target position, the PZT actuator 320 may take over the movement of the head(s) for very fine movements. In another embodiment, the PZT actuator 320 and the VCM 325 may move the head(s) in parallel. It should be noted that although PZT is used throughout in the description of the control system of FIG. 3, as disclosed above, other types of actuators may be used in place of PZTs, and the system of FIG. 3 may be adapted accordingly in other embodiments.

Figure 4:
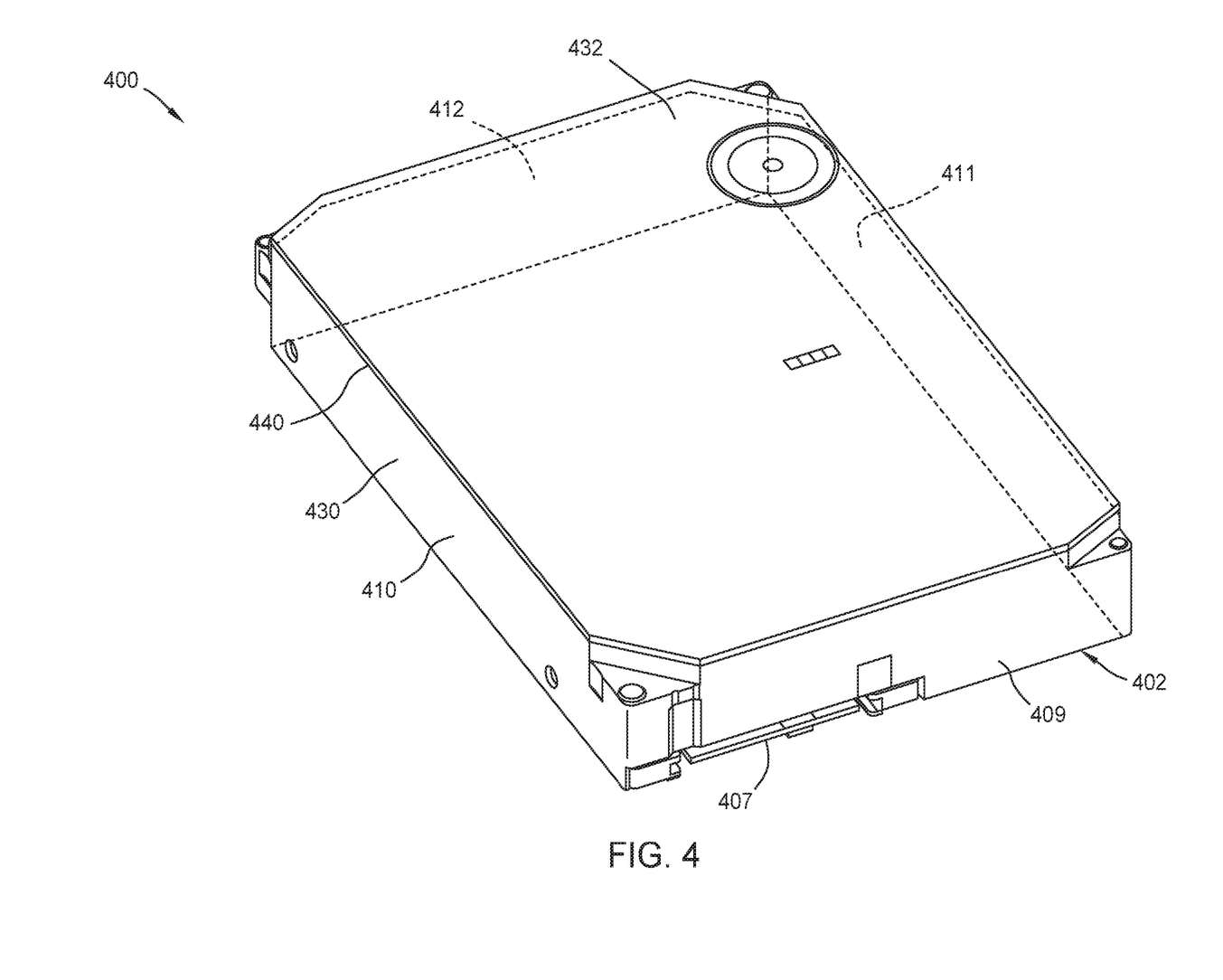
FIG. 4 is a schematic illustration of an enclosure with interface connector according to one embodiment.

FIG. 4 is a schematic illustration of a casing 400 with interface connector according to one embodiment. The casing 400 comprises a housing 402 that seals or enclose an interior cavity, such as the cavity described in FIG. 1A, defined within the housing. The housing 402 comprises a base 430 and a cover 432. The cover 432 is coupled to the base 430 to enclose the interior cavity from the environment exterior to the housing 402. In some implementations, a seal or gasket is positioned between the base 430 and the cover 432 to promote a hermetic seal between the base 430 and the cover 432. In some examples, the seal between the base 430 and the cover 432 is sufficiently strong to retain, over time, the environmental conditions within the interior cavity at the time the housing 402 is sealed.

Furthermore, the housing 402 comprises a first wall 409, a second wall 412, a third wall 410, and a fourth wall 411.

The first wall 409 and the second wall 412 are parallel to and the same length as each other. Likewise, the third wall 410 and the fourth wall 411 are parallel to and the same length as each other. The third wall 410 and the fourth wall 411 are longer than the first wall 409 and the second wall 412. The first wall 409 and the second wall 412 are coupled together by the third wall 410 at one end of the first wall 409 and the corresponding end of the second wall 412 and are coupled together by the fourth wall 411 at the opposite end of the first wall 409 and the corresponding opposite end of the second wall 412. The first wall 409 comprises a cutout for an interface connecter 407 recessed into the base 430.

Figure 5:
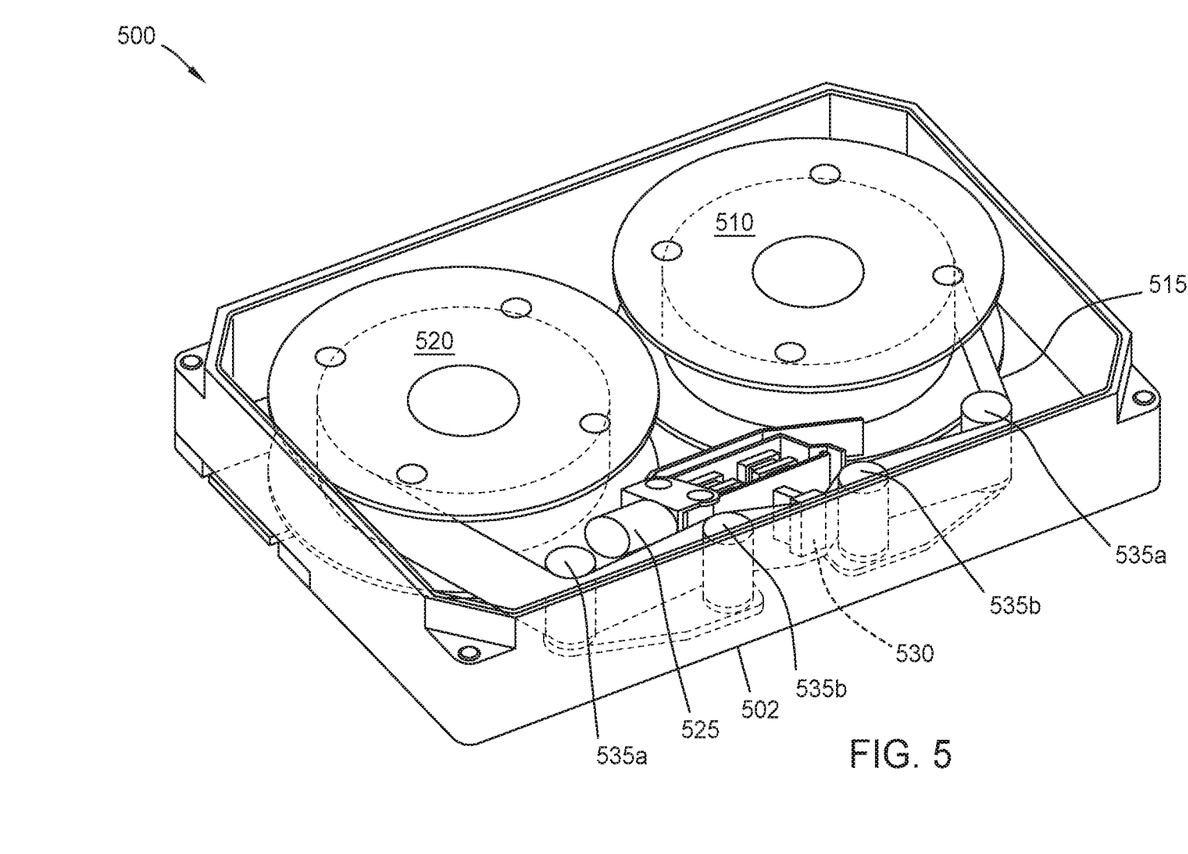
FIG. 5 is a schematic illustration of a tape embedded drive with interface connector according to one embodiment.

FIG. 5 is a schematic illustration of a tape embedded drive 500 with interface connector according to one embodiment. Aspects of the tape embedded drive 500 may be similar to the tape embedded drive 100 of FIG. 1A. The tape embedded drive comprises a housing 502, one or more tape reels 510, one or more motors (e.g., a stepping motor 520 (also known as a stepper motor), a voice coil motor (VCM) 525, etc.) a head assembly 530 with one or more read heads and one or more write heads, and tape guides/rollers 535a, 535b.

In the illustrated embodiments, two tape reels 510 are placed in the interior cavity of the housing 502, with the center of the two tape reels on the same level in the cavity and with the head assembly 530 located in the middle and below the two tape reels. Tape reel motors located in the spindles of the tape reels can operate to wind and unwind the tape media 515 in the tape reels. Each tape reel may also incorporate a tape folder to help the tape media 515 be neatly wound onto the reel. The tape media may be made via a sputtering process to provide improved areal density. The tape media 515 comprises two surfaces, an oxide side and a substrate side. The oxide side is the surface that can be magnetically manipulated (written to or read from) by one or more read/write heads. The substrate side of the tape media 515 aids in the strength and flexibility of the tape media 515.

Tape film from the tape reels are biased against the guides/rollers 535a, 535b (collectively referred to as guides/rollers 535) and are movably passed along the head assembly 530 by movement of the reels. The illustrated embodiment shows four guides/rollers 535a, 535b, with the two guides/rollers 535a furthest away from the head assembly 530 serving to change direction of the film and the two guides/rollers 535b closest to the head assembly 530 by pressing the film against the head assembly 530.

The guides/rollers 535 utilize the same structure in one embodiment. In other embodiments, the guides/rollers 535 may have more specialized shapes and differ from each other based on function. Furthermore, a lesser or a greater number of rollers may be used. For example, the two functional rollers may be cylindrical in shape, while the two functional guides may be flat-sided (e.g., rectangular prism) or clip shaped with two prongs and the film moving between the prongs of the clip.

The voice coil motor and stepping motor may variably position the tape head(s) transversely with respect to the width of the recording tape. The stepping motor may provide coarse movement, while the voice coil motor may provide finer actuation of the head(s). In an embodiment, servo data may be written to the tape to aid in more accurate position of the head(s) along the tape film.

In addition, the cavity of the housing 502 comprises one or more particle filters and/or desiccants to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape winds/unwinds, and the particle filters may be placed within that airflow.

Figure 6A:
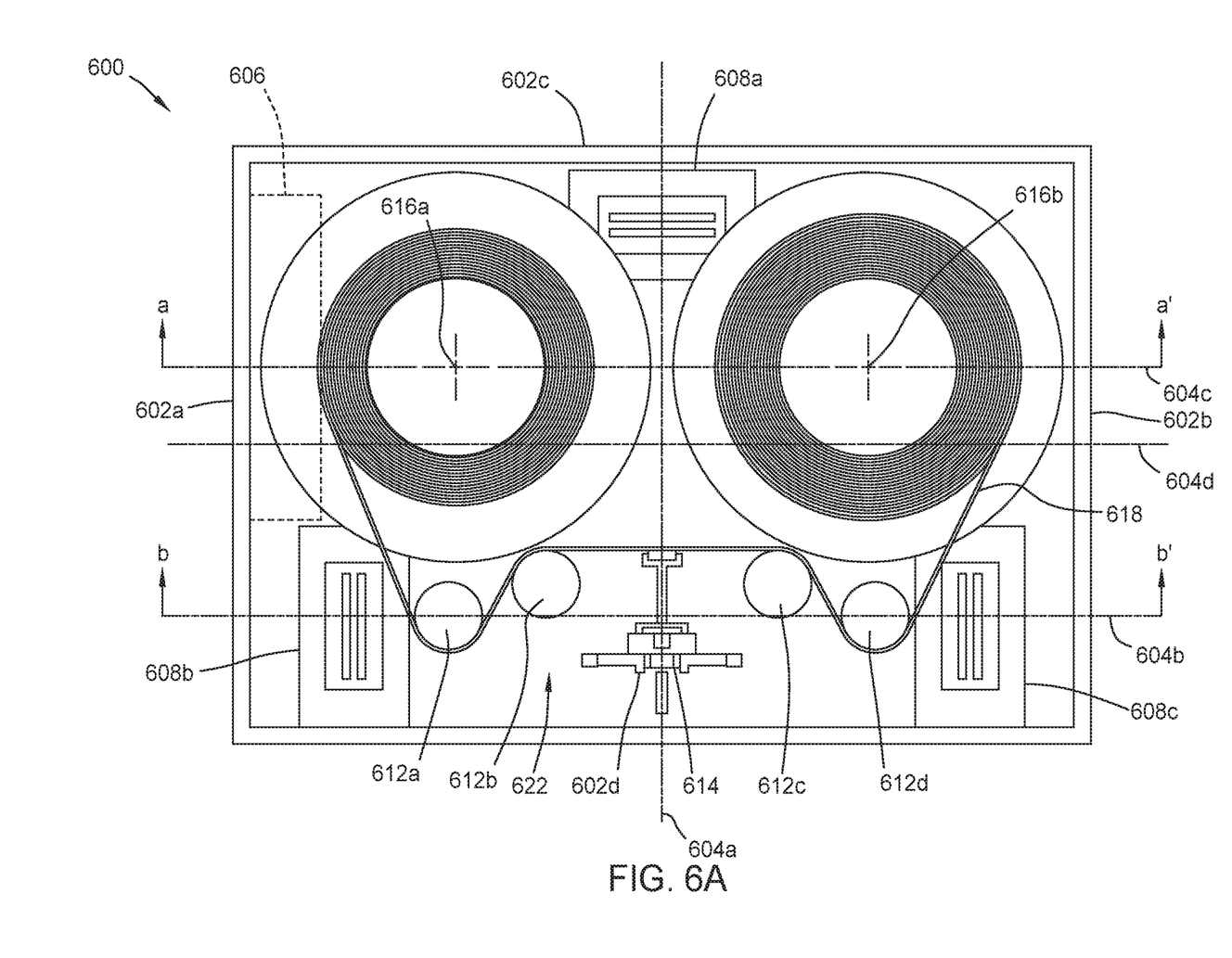
FIGS. 6A-6C are schematic cross-sectional and top views of a tape embedded drive according to one embodiment.
Figure 6B:
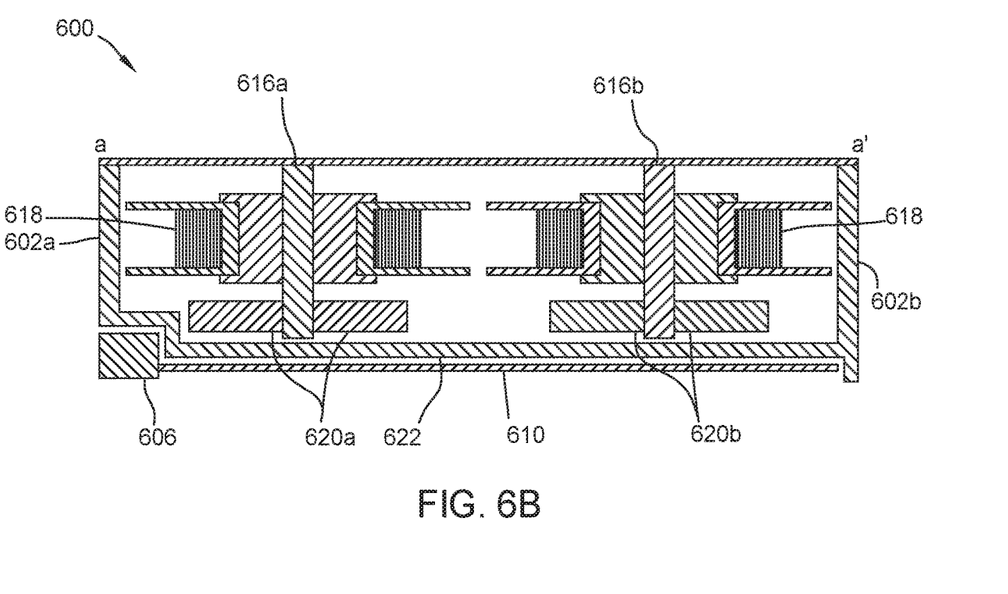
Figure 6C:
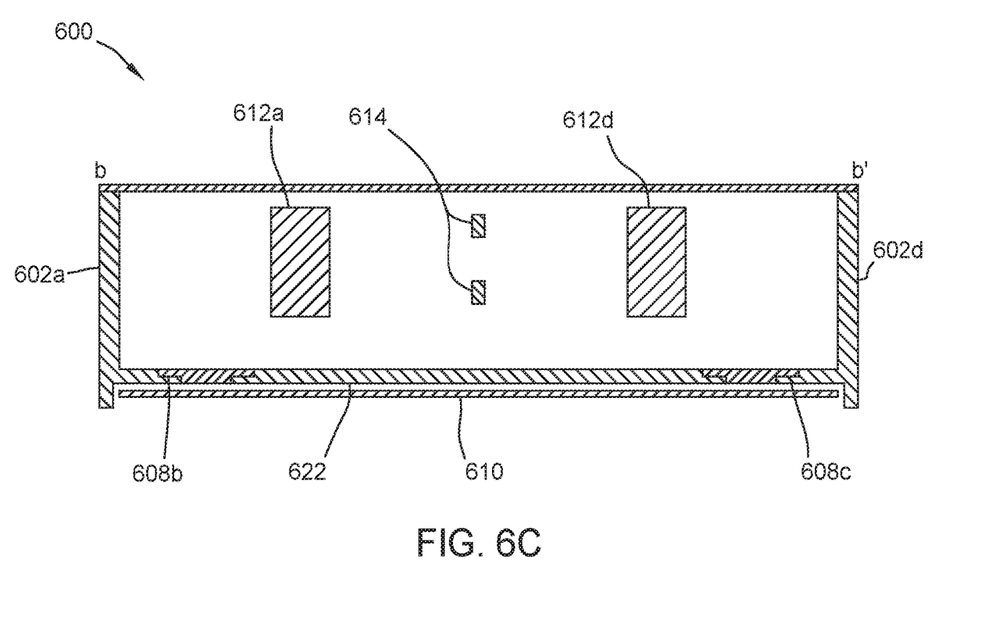

FIGS. 6A-6C are schematic cross-sectional and top views of a tape embedded drive according to one embodiment. FIG. 6A is a top view of the tape embedded drive 600. FIG. 6B is a schematic cross-sectional view across the a-a' 604c line of the tape embedded drive 600. FIG. 6C is a schematic cross-sectional view across the b-b' 604b line of the tape embedded drive 600. Certain aspects of FIGS. 6A-6C may be similar to elements of the previous figures.

The tape embedded drive 600 comprises a first wall and a second wall, wherein the first wall 602a and the second wall 602b are parallel and have the same length. An end of the first wall 602a and a respective end of the second wall 602b are connected by a third wall 602c, wherein the third wall 602c is perpendicular to the first wall 602a and the second wall 602b. A fourth wall 602d is perpendicular to both the first wall 602a and the second wall 602b and parallel to the third wall 602c. The fourth wall 602d connects the first wall 602a and the second wall 602b at the opposite end of where the third wall 602c connects the first wall 602a and the second wall 602b. The third wall 602c and the fourth wall 602d are parallel and have the same length, wherein the length of the third wall 602c and the fourth wall 602d is longer than the length of the first wall 602a and the second wall 602b. The first wall 602a, second wall 602b, third wall 602c, and fourth wall 602d are arranged in the configuration above to create an enclosure (referred to as an enclosure 602 for the configurations of the walls described above) for the components of the tape embedded drive 600.

Within the enclosure 602, the tape embedded drive 600 comprises components such as a first tape reel 616a coupled to a first tape spindle, a second tape reel 618b coupled to a second tape spindle, a tape media 618 or tape film, a first tape motor or a first spindle motor 620a coupled to the first tape reel 616a, and the base 622, a second tape motor or a second spindle motor 620b coupled to the second tape reel 616b, and the base 622, a head assembly 614, a first guide roller 612a, a second guide roller 612b, a third guide roller 612c, a fourth guide roller 612d, and a PCBA 610. The first spindle motor 620a and the second spindle motor 620b each has a bottom surface separating the spindle motors 620a, 620b from the base 622.

In the current embodiment, locations of components of the enclosure 602 may be described in relation to one or more hypothetical lines 604a, 604b, 604c, 604d. The locations described are not intended to be limiting, but to provide examples of possible embodiments. The first hypothetical line 604a intersects the midpoint of the third wall 602c and the midpoint of the fourth wall 602d and is parallel to the first wall 602a and the second wall 602b. The second hypothetical line 604b intersects the guide rollers 612a and 612b and is parallel to the third wall 602c and the fourth wall 602d. The second hypothetical line 604b is spaced a first distance from the third wall 602c and a second distance from a fourth wall 602d, where the first distance is greater than the second distance. The third hypothetical line 604c intersects the midpoint of the tape reels 616a and 616b and is parallel to the third wall 602c and the fourth wall 602d. The third hypothetical line 604c is spaced a third distance from the third wall 602c and a fourth distance from a fourth wall 602d, where the fourth distance is greater than the third distance. The fourth hypothetical line 604d intersects the midpoint of the first wall 602a and the midpoint of the second wall 602b and is parallel to the third wall 602c and the fourth wall 602d.

Aspects of the PCBA 610 may be similar to the PCBA 155 of FIG. 2. The PCBA 610 comprises an enclosure recess 706 for an interface connector, a first feedthrough connector 608a, a second feedthrough connector 608b, and a third feedthrough connector 608c. For example, the locations of each component previously mentioned may minimize the interference of connection units, such as wires, between the component and the recipient side, such as the one or more read/write heads. The enclosure recess 606 for an interface connector is centered along the third hypothetical line 604c, where the enclosure recess 606 allows for a connection unit along the first wall 602a. In certain embodiments, the interface connector of the enclosure recess 606 may have a top surface, wherein the top surface is not aligned with the bottom surface of the first spindle motor 620a. The enclosure recess 606 may be appropriately sized, such that the internal environment of the enclosure 602 remains airtight and isolated from the external environment.

The first feedthrough connector 608a is coupled to the base 622 and is centered along the first hypothetical line 604a. The first feedthrough connector 608a may be next to the third wall 602c, such that a first distance between the first feedthrough connector 608a and the third wall 602c is less than a second distance between the first feedthrough connector 608a and the third hypothetical line 604c. The second feedthrough connector 608b and the third feedthrough connector 608c are both coupled to the base 622 and centered along the second hypothetical line 604b. The second feedthrough connector 608b and the third feedthrough connector may be on opposite sides of the first hypothetical line 604a, such that the second feedthrough connector 608b is between the first tape roller 612a and the first wall 602a and the third feedthrough connector 608c is between the fourth guide roller 612d and the second wall 602b. The first feedthrough connector 608a, the second feedthrough connector 608b, and the third feedthrough connector 608c are coupled to the base 622, each with a connection to the PCBA 610. In certain embodiments, more than the listed number of feedthrough connectors may be applicable to the current embodiment. In other embodiments, less than the listed number of feedthrough connectors may be applicable to the current embodiment. In certain embodiments, the center of recess 606 and the third hypothetical line 604c are aligned. In certain embodiments, the recess 606 is closer to third wall 602c than fourth wall 602d. In certain embodiments, the third hypothetical line 604c is disposed closer to third wall 602c than fourth wall 602d. In certain embodiments, second feedthrough connector 608b is disposed closer to fourth wall 702d than to third wall 602c.

By placing the interface connector along a short side of the tape embedded drive below one of the reels, along with the relative placement of the reels guide rollers, and feedthrough connectors to accommodate power lines for motors and signal lines for sensors and read/write elements, a mechanically stable tape embedded drive is possible.

In one embodiment, a storage device comprises: an enclosure; a first spindle disposed within the enclosure, wherein the enclosure comprises a first wall, a second wall, a third wall connecting the first wall and the second wall, a fourth wall connecting the first wall and the second wall, and a bottom surface coupled to the first wall, the second wall, the third wall, and the fourth wall; a second spindle disposed within the enclosure; and an interface connector coupled to the enclosure along the first wall, wherein the interface connector is disposed closer to the third wall than the fourth wall, and wherein a center of the first spindle and a center of the second spindle are disposed closer to the third wall than the fourth wall. The first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall. The interface connector is coupled to the bottom surface and the first wall. The interface connector is spaced from the second wall, the third wall, and the fourth wall. The storage device further comprises a first feedthrough connector and a second feedthrough connector and wherein a first feedthrough connector is adjacent the interface connector. The first feedthrough connector is disposed on a first side of a bottom surface of the enclosure and the interface connector is disposed on a second side of the bottom surface that is opposite to the first side. A width of the interface connector is less than a diameter of a reel to be placed on the first spindle.

In another embodiment, a storage device comprises: an enclosure having a first wall, a second wall, a third wall connecting the first wall and the second wall, a fourth wall connecting the first wall and the second wall, and a bottom surface coupled to the first wall, the second wall, the third wall, and the fourth wall, wherein the first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall; a first spindle disposed within the enclosure and coupled to the bottom surface; a second spindle disposed within the enclosure and coupled to the bottom surface; a tape head disposed within the enclosure; and an interface connector coupled to the bottom surface and the first wall, wherein the interface connector is disposed at a location below a hypothetical reel that would be disposed in the first spindle. The storage device further comprises: a first feedthrough connector coupled to the bottom surface, wherein the first feedthrough connector is centered on a hypothetical centerline that is parallel to the first wall and the second wall; a second feedthrough connector coupled to the bottom surface, wherein the second feedthrough connector is spaced from the hypothetical centerline; and a third feedthrough connector coupled to the bottom surface, wherein the third feedthrough connector is spaced from the hypothetical centerline. A center of the second feedthrough connector is aligned with a center of the third feedthrough connector along a second hypothetical line. A center of the interface connector is aligned with a center of the first spindle and a center of the second spindle by a third hypothetical line. The second hypothetical line is substantially parallel to the third hypothetical line. The third hypothetical line is spaced from a fourth hypothetical line connecting a center of the first wall and a center of the second wall. The second hypothetical line is spaced a first distance from the third wall and a second distance from the fourth wall and wherein the first distance is greater than the second distance.

In another embodiment, a storage device comprises: an enclosure having a first wall, a second wall, a third wall connecting the first wall and the second wall, a fourth wall connecting the first wall and the second wall, and a bottom surface coupled to the first wall, the second wall, the third wall, and the fourth wall, wherein the first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall; a first spindle disposed within the enclosure and coupled to the bottom surface; a second spindle disposed within the enclosure and coupled to the bottom surface; a tape head disposed within the enclosure; and an interface connector coupled to the bottom surface, wherein a center of the interface connector, a center of the first spindle, and a center of the second spindle are each spaced a first distance from the third wall and a second distance from the fourth wall, and wherein the first distance is less than the second distance. The storage device is a tape embedded drive. The bottom surface has a recess and wherein the interface connector is disposed within the recess. The storage device further comprising a first spindle motor coupled to the first spindle, wherein the first spindle motor has a bottom surface. The interface connector has a top surface and wherein the top surface is not aligned with the bottom surface of the first spindle motor. The storage device further comprises a printed circuit board assembly coupled with the bottom surface of the enclosure and the interface connector.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
   an enclosure, wherein the enclosure comprises a first wall, a second wall, a third wall connecting the first wall and the second wall, a fourth wall connecting the first wall and the second wall, and a bottom surface coupled to the first wall, the second wall, the third wall, and the fourth wall;
   a first spindle disposed within the enclosure;
   a second spindle disposed within the enclosure; and
   an interface connector coupled to the enclosure along the first wall, wherein the interface connector is disposed closer to the third wall than the fourth wall, wherein a center of the first spindle and a center of the second spindle are disposed closer to the third wall than the fourth wall, and wherein the interface connector is spaced from the second wall, the third wall, and the fourth wall.

2. The storage device of claim 1, wherein the first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall.

3. The storage device of claim 1, wherein the interface connector is coupled to the bottom surface and the first wall.

4. The storage device of claim 1, wherein a width of the interface connector is less than a diameter of a reel to be placed on the first spindle.

5. The storage device of claim 1, wherein the bottom surface has a recess disposed adjacent to the first wall, the interface connector being disposed within the recess, and wherein the interface connector has a smaller length than at least the first wall and the third wall.

6. A storage device, comprising:
   an enclosure, wherein the enclosure comprises a first wall, a second wall, a third wall connecting the first wall and the second wall, a fourth wall connecting the first wall and the second wall, and a bottom surface coupled to the first wall, the second wall, the third wall, and the fourth wall;
   a first spindle disposed within the enclosure;
   a second spindle disposed within the enclosure;
   an interface connector coupled to the enclosure along the first wall, wherein the interface connector is disposed closer to the third wall than the fourth wall, and wherein a center of the first spindle and a center of the second spindle are disposed closer to the third wall than the fourth wall; and
   a first feedthrough connector and a second feedthrough connector and wherein a first feedthrough connector is adjacent the interface connector.

7. The storage device of claim 6, wherein the first feedthrough connector is disposed on a first side of a bottom surface of the enclosure and the interface connector is disposed on a second side of the bottom surface that is opposite to the first side.

8. A storage device, comprising:
   an enclosure having a first wall, a second wall, a third wall connecting the first wall and the second wall, a fourth wall connecting the first wall and the second wall, and a bottom surface coupled to the first wall, the second wall, the third wall, and the fourth wall, wherein the first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall;
   a first spindle disposed within the enclosure and coupled to the bottom surface;
   a tape reel coupled to the first spindle;
   a second spindle disposed within the enclosure and coupled to the bottom surface;
   a tape head disposed within the enclosure;
   an interface connector coupled to the bottom surface and the first wall, wherein the interface connector is disposed at a location below the tape reel coupled to the first spindle;
   a first feedthrough connector coupled to the bottom surface, wherein the first feedthrough connector is centered on a first hypothetical centerline that is parallel to the first wall and the second wall;
   a second feedthrough connector coupled to the bottom surface, wherein the second feedthrough connector is spaced from the first hypothetical centerline; and
   a third feedthrough connector coupled to the bottom surface, wherein the third feedthrough connector is spaced from the first hypothetical centerline.

9. The storage device of claim 8, wherein a center of the second feedthrough connector is aligned with a center of the third feedthrough connector along a second hypothetical line.

10. The storage device of claim 9, wherein a center of the interface connector is aligned with a center of the first spindle and a center of the second spindle by a third hypothetical line.

11. The storage device of claim 10, wherein the second hypothetical line is substantially parallel to the third hypothetical line.

12. The storage device of claim 10, wherein the third hypothetical line is spaced from a fourth hypothetical line connecting a center of the first wall and a center of the second wall.

13. The storage device of claim 9, wherein the second hypothetical line is spaced a first distance from the third wall and a second distance from the fourth wall and wherein the first distance is greater than the second distance.

14. The storage device of claim 8, wherein the interface connector has a smaller length than the first, second, third, and fourth walls, and wherein the interface connector is spaced from the second, third, and fourth walls.

15. A storage device, comprising:
- an enclosure having a first wall, a second wall, a third wall connecting the first wall and the second wall, a fourth wall connecting the first wall and the second wall, and a bottom surface coupled to the first wall, the second wall, the third wall, and the fourth wall, wherein the first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall;
- a first spindle disposed within the enclosure and coupled to the bottom surface;
- a second spindle disposed within the enclosure and coupled to the bottom surface;
- a tape head disposed within the enclosure; and
- an interface connector coupled to the bottom surface, wherein a center of the interface connector, a center of the first spindle, and a center of the second spindle are each spaced a first distance from the third wall and a second distance from the fourth wall, wherein the first distance is less than the second distance, and wherein the bottom surface has a recess and wherein the interface connector is disposed within the recess.

16. The storage device of claim 15, wherein the storage device is a tape embedded drive.

17. The storage device of claim 15, further comprising a first spindle motor coupled to the first spindle, wherein the first spindle motor has a bottom surface.

18. The storage device of claim 17, wherein the interface connector has a top surface and wherein the top surface is not aligned with the bottom surface of the first spindle motor.

19. The storage device of claim 15, further comprising a printed circuit board assembly coupled with the bottom surface of the enclosure and the interface connector.

20. The storage device of claim 15, further comprising one or more feedthrough connectors, wherein a first feedthrough connector of the one or more feedthrough connectors is disposed adjacent the interface connector.

\* \* \* \* \*